(12) United States Patent
Cooper et al.

(10) Patent No.: US 8,807,333 B1
(45) Date of Patent: Aug. 19, 2014

(54) TABLET CASE

(71) Applicant: C6 Life Limited, Derbyshire (GB)

(72) Inventors: Guy Cooper, Derbyshire (GB);
Nicholas Stavrakakis, Derbyshire (GB);
Brendan Lake, Derbyshire (GB);
William Matters, Derbyshire (GB)

(73) Assignee: C6 Life Limited, Derbyshire (GB)

( * ) Notice: Subject to any disclaimer, the term of this patent is extended or adjusted under 35 U.S.C. 154(b) by 0 days.

(21) Appl. No.: 13/917,822

(22) Filed: Jun. 14, 2013

(30) Foreign Application Priority Data

Apr. 8, 2013 (GB) .................................. 1306312.8

(51) Int. Cl.
*B65D 5/52* (2006.01)
(52) U.S. Cl.
USPC ....................................... 206/45.23; 206/320
(58) Field of Classification Search
USPC .......... 206/320, 45.2, 45.23, 45.24, 576, 701, 206/818
See application file for complete search history.

(56) References Cited

U.S. PATENT DOCUMENTS

| | | | | |
|---|---|---|---|---|
| 4,651,872 | A * | 3/1987 | Joyce ............................. | 206/760 |
| 6,925,739 | B1 * | 8/2005 | Cole et al. ....................... | 40/120 |
| 7,318,521 | B2 * | 1/2008 | Lau ............................. | 206/45.24 |
| 8,016,107 | B2 * | 9/2011 | Emsky .......................... | 206/320 |
| 8,132,670 | B1 * | 3/2012 | Chen ............................ | 206/320 |
| 8,143,982 | B1 * | 3/2012 | Lauder et al. .................. | 335/219 |
| 8,264,310 | B2 | 9/2012 | Lauder et al. | |
| 2012/0268891 | A1 | 10/2012 | Cencioni | |
| 2013/0043148 | A1 * | 2/2013 | Chen et al. .................. | 206/45.23 |
| 2013/0048514 | A1 * | 2/2013 | Corcoran et al. .......... | 206/45.23 |
| 2013/0075280 | A1 * | 3/2013 | Besner ....................... | 206/45.23 |
| 2013/0092562 | A1 * | 4/2013 | Wyner et al. .............. | 206/45.23 |
| 2013/0213825 | A1 * | 8/2013 | Blume et al. .............. | 206/45.24 |

FOREIGN PATENT DOCUMENTS

| | | |
|---|---|---|
| CH | 705314 A2 | 1/2013 |
| DE | 202012007209 U1 | 11/2012 |
| EP | 2511790 A2 | 10/2012 |
| KR | 20110093740 A | 8/2011 |
| WO | WO 2013045774 A2 | 4/2013 |

OTHER PUBLICATIONS

Search Report dated Oct. 8, 2013, for UK Patent Application No. GB1306312.8.
International Search Report and Written Opinion mailed Nov. 12, 2013, for International Patent Application No. PCT/GB2013/000251.
Nick Guy: "Apple iPad Smart Case", iLounge, Jun. 12, 2012, URL: http://www.ilounge.com/index.php/reviews/entry/apple-ipad-smart-case/.
Gonny van der Zwaag: "10 alternatieven voor de iPad Smart Case", iPadclub, Jun. 15, 2012, URL: http://www.ipadclub.nl/39944/tien-altenatieven-voor-ipad-smart-case/.

* cited by examiner

*Primary Examiner* — Jacob K Ackun
(74) *Attorney, Agent, or Firm* — Thomas, Karceski & Karmilovich, PC

(57) ABSTRACT

A tablet case with a cover, the tablet case comprising a housing having three upstanding walls, at least one of the three upstanding walls having a flange, the housing being adapted to receive and retain a tablet. The tablet case further comprises a cover having a substantially rectangular foldable planar member and an elongated member which extends from the cover into an indentation on the inside of the housing. A section of the elongated member is secured to the indentation to form a substantially planar surface arranged to abut the rear wall of a tablet. First and second magnetic means are provided on the housing and cover respectively to allow the cover to be folded into a stand and secured to the housing or to allow the cover to simply shield a tablet screen.

16 Claims, 5 Drawing Sheets

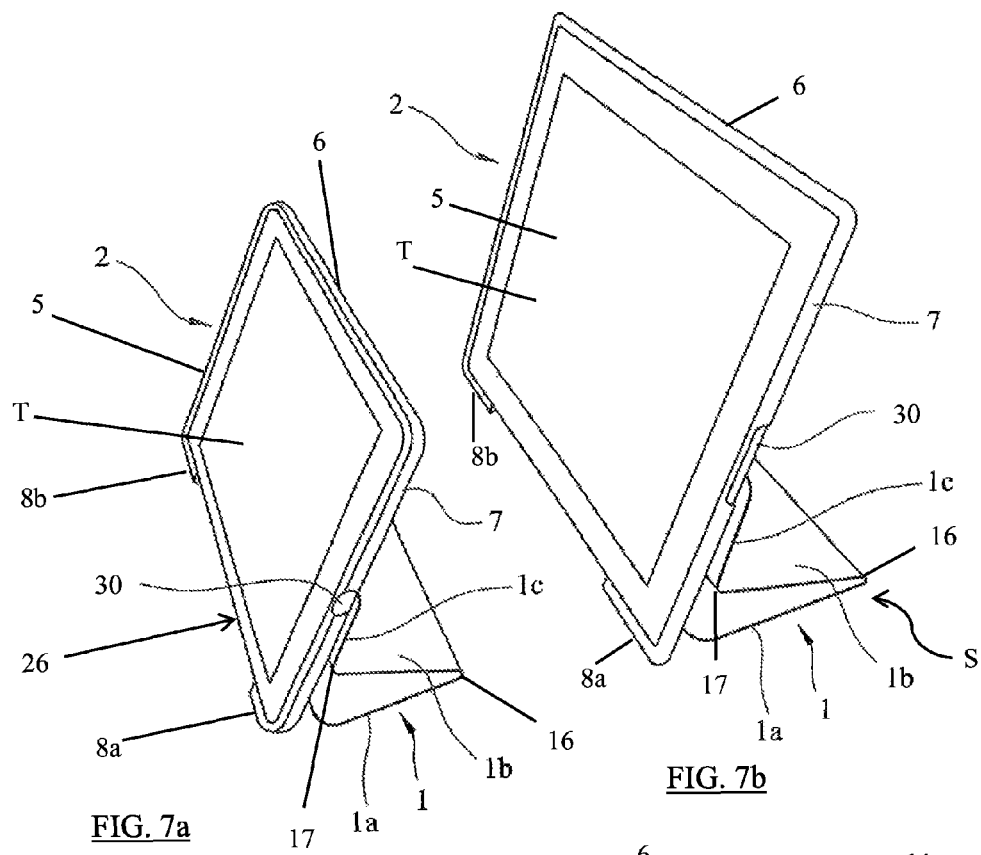
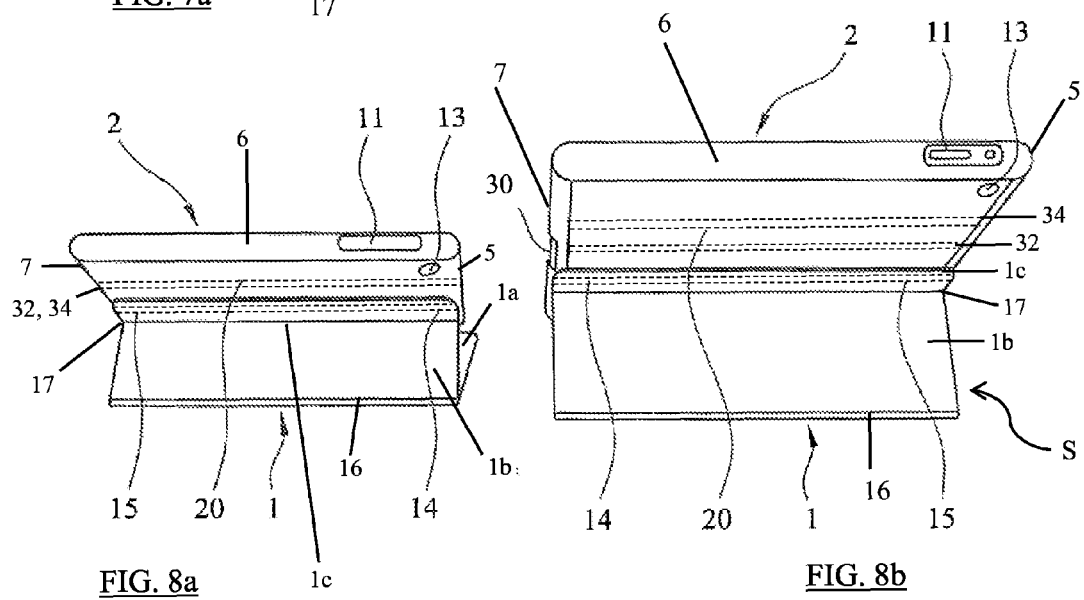

TABLET CASE

CROSS-REFERENCE TO RELATED APPLICATION(S)

This United States Non-Provisional Patent Application relies for priority on United Kingdom Patent Application No. 1306312.8, filed on Apr. 8, 2013, the entire contents of which are incorporated herein by reference.

FIELD OF THE INVENTION

The present invention relates to case with a cover for a tablet, that is, a substantially planar electronic device having a screen, the cover having a closed position to protect the screen and being securable in a support position to support the tablet to allow a user to touch and or view the screen in a comfortable position. In particular, but not exclusively, the present invention relates to a tablet case with a cover wherein the cover is securable in the support position by magnetic means.

DESCRIPTION OF THE RELATED ART

Known foldable tablet covers having magnetic securing means suffer from the problem of being designed to allow a user to look at the tablet as if it were a computer screen or a book on a book stand. In other words, known foldable tablet covers having magnetic securing means allow the tablet to be placed in a substantially upstanding position. Accordingly, when the user uses the tablet to touch the screen or type he has to adopt an unnatural and uncomfortable typing position which, over time, may lead to wrist or arm injuries, or he has to place the tablet on his lap and look down which, over time may lead to neck injury because, when using tablets, a user's neck is bent to a higher degree than when using a laptop or desktop. In fact, recent studies and reported observations from doctors and physiotherapists, have highlighted that hand-held devices, such as tablets, cause additional strain on neck and shoulder muscles which can lead to both short- and long-term health issues for users.

Another problem present in known foldable tablet covers is that the cover is typically folded into small sections, therefore, the cover is prone to collapse and the tablet is easily knocked over.

SUMMARY OF THE INVENTION

The present invention therefore seeks to allow a tablet to be supported in a manner which enables the screen to be displayed but also allows the user to type in a more ergonomic position. In addition, the present invention seeks to provide a more stable base for the tablet. Throughout the specification, the term tablet is intended to include any a substantially planar electronic device having a screen, including tablet computers, smartphones and e-readers.

According to the present invention, there is provided a tablet case comprising a housing and a cover linked together by joining means, the housing comprising a planar inner surface arranged to abut the rear wall of a tablet, three upstanding walls arranged to engage three side walls of a tablet, at least one of the three upstanding walls having a flange arranged to engage and retain a tablet in the housing, and first magnetic means arranged on an outer wall of the housing, the cover comprising a foldable planar member movable between a folded position to cover a tablet screen and a support position to form a tablet stand, the cover having second magnetic means to allow the foldable planar member to be magnetically secured to the rear wall of the housing in the support position. This tablet case has the advantages of providing a more stable base when the housing and cover are folded into a stand and also to allow the user to use the tablet in a more ergonomic position. Moreover, as the housing is linked to the cover directly, the tablet case of the present invention provides additional stability and reliance because the cover will not become disconnected from the tablet easily.

Advantageously, the first and second magnetic means comprise at least two spaced magnets or magnetisable points. This has the advantage of allowing the tablet case and cover to be used with widely available tablets, such as IPADS®, SAMSUNG GALAXY® tablets and KINDLE FIRE® tablets; these tablets have a pair of spaced magnets, typically on the upper and bottom right corners of the screen, to switch the screen into sleep mode. Accordingly, when the cover is closed over one of these tablets, the tablet is switched into sleep mode. More advantageously, in a preferred embodiment of the present invention the first magnetic means is arranged on the outer wall of the housing and the second magnetic means is arranged on the foldable planar member to form a magnetic strip extending in a substantially linear manner. This feature allows the tablet case and cover to be securely folded into a stand.

Preferably, the foldable planar member is arranged to allow a tablet to be supported at an angle of between 50 and 70 degrees. More preferably, the foldable planar member is arranged to allow a tablet to be supported at an angle of substantially 60 degrees. This allows a user to use the tablet in a more ergonomic position than that provided by other known cases and or covers.

In a preferred embodiment the housing is made from plastic materials, rubber or carbon fibre and the cover is made from plastic materials, rubber or leather. These materials are relatively inexpensive and easy to source. In a further preferred embodiment the plastics material is polyurethane or thermoplastic material. More preferably, the thermoplastic material is acrylonitrile butadiene styrene, polycarbonate or a thermoplastic elastomer. These materials are particularly suitable to be used for the tablet case and cover because they are inexpensive and easy to use in injection moulding, in which case the housing may be joined to the cover by a film hinge.

Advantageously, the housing comprises openings to allow access to buttons or ports located on a tablet. This feature allows the unobstructed use of the tablet.

In a preferred embodiment, the rear wall of the housing comprises further magnetic means spaced apart from the first magnetic means to allow the foldable planar member to be magnetically secured to the rear wall of the housing in a further stand position. This feature allows the user to fold the cover into two different folded stand positions.

Advantageously, a first and second partial wall each having a first and second partial flange are provided on a fourth side of the housing. More advantageously, each one of the first and second partial flanges has a cut-out arranged to facilitate insertion or removal of the tablet into or out of the housing. Even more advantageously, a groove is provided on the flange. These features allow the tablet to be securely engaged by the case, easily inserted and/or removed from the case and also allow the user to easily lift the foldable planar member from the screen.

BRIEF DESCRIPTION OF THE DRAWINGS

A preferred embodiment of the present invention will now be described, by way of example only, with reference to the accompanying drawings in which:

FIG. 7a is a perspective view of the embodiment shown in FIG. 1 installed in a tablet of a first size, FIG. 7b is a perspective view of the embodiment shown in FIG. 1 installed in a tablet of a second size, FIG. 8a is a rear perspective view of the embodiment illustrated in FIG. 7a, and FIG. 8b is a rear perspective view of the embodiment illustrated in FIG. 7b.

DETAILED DESCRIPTION OF EMBODIMENTS(S) OF THE INVENTION

Figure 1:
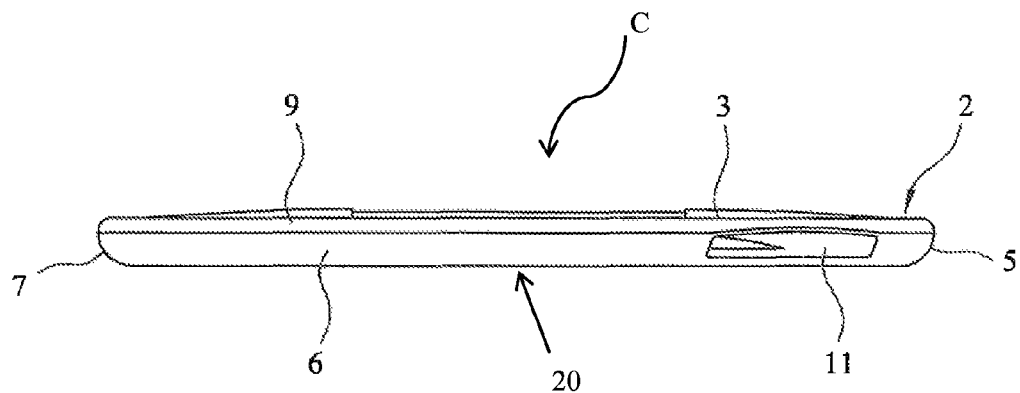
FIG. 1 is a side view of a preferred embodiment of the present invention in the folded position.

Referring now to FIG. 1, there is shown a side view of an embodiment of the tablet case C with a cover 1 of the present invention. In this particular figure, only the case C is visible. The case C consists of a substantially rectangular housing 2 having an internal planar surface 3 arranged to abut the rear wall of a tablet T (shown in FIGS. 7a and 7b) and three upstanding walls 5, 6, 7 arranged to engage a top, bottom and side wall of the tablet T. On the outer edge of at least one of the three upstanding walls 5, 6, 7, there is provided an inwardly extending flange 9 arranged to securely locate the tablet T. The flange 9 extends over the length of the at least one upstanding wall 5, 6, 7. In the preferred embodiment shown in these figures, the three upstanding walls 5, 6, 7 have an inwardly extending flange 9 on each of their respective outer edges. Each upstanding wall 5, 6, 7 may comprise one or more openings 11 arranged to allow a user to press buttons or access ports in the tablet T. The case C may be made from plastic materials, such as polyurethane or thermoplastics including but not limited to acrylonitrile butadiene styrene, polycarbonate and thermoplastic elastomers, rubber or carbon fibre.

Figure 2:
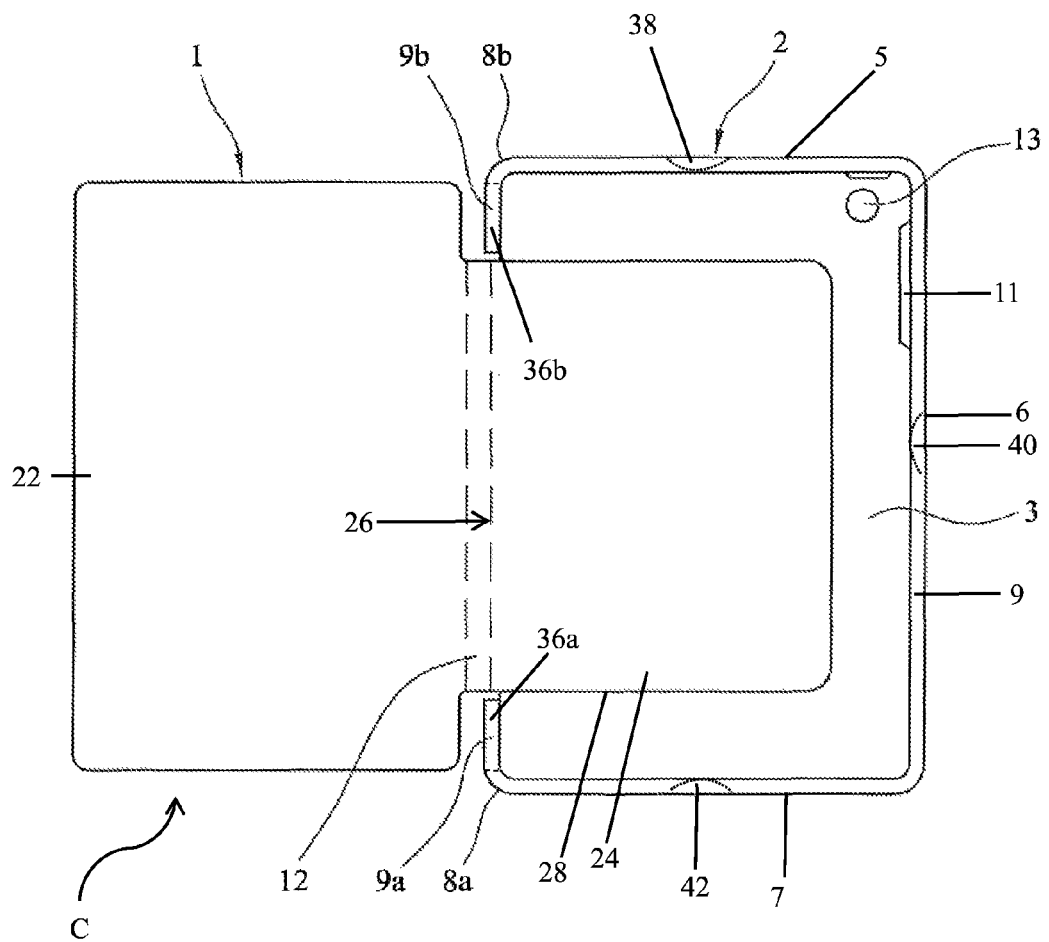
FIG. 2 is a top view of the embodiment shown in FIG. 1.
Figure 3:
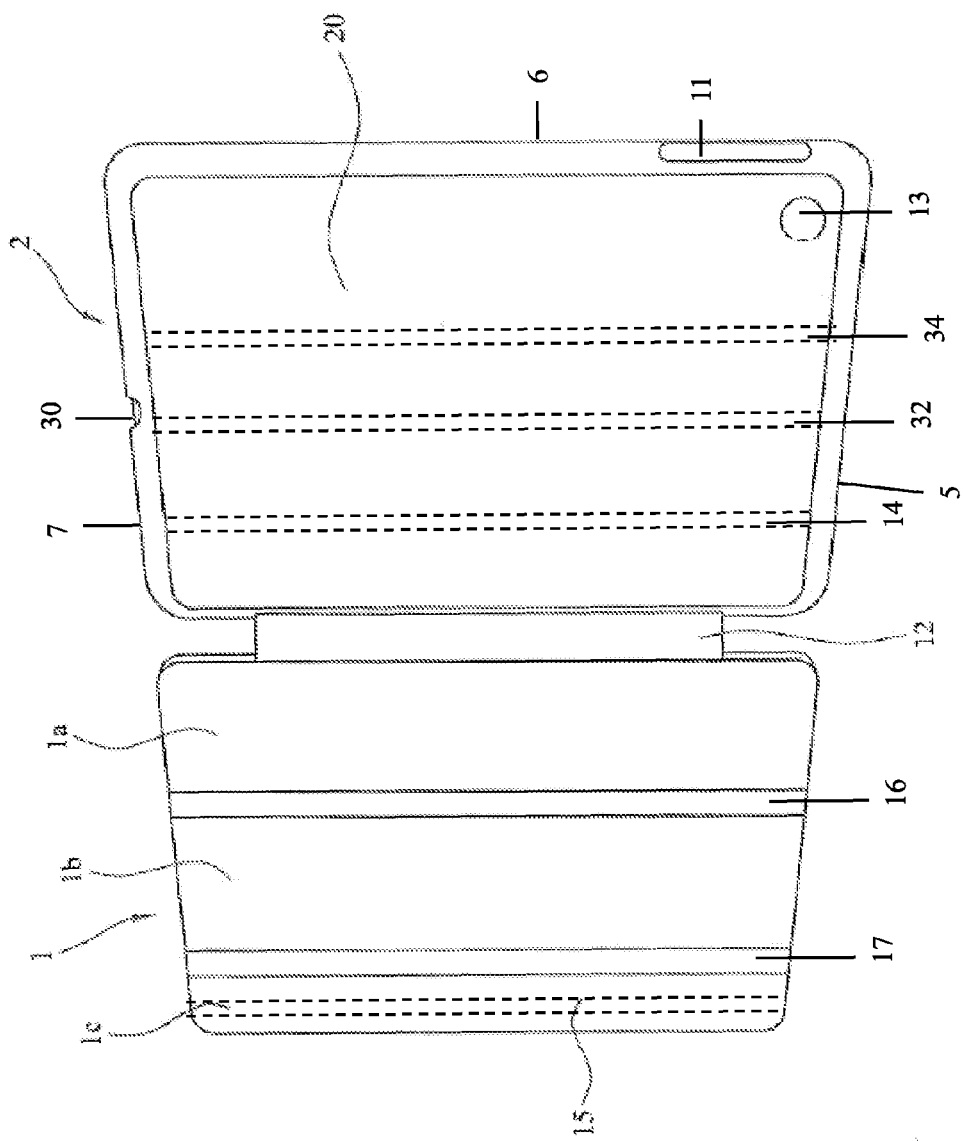
FIG. 3 is a posterior view of the embodiment shown in FIG. 1.
Figure 4:
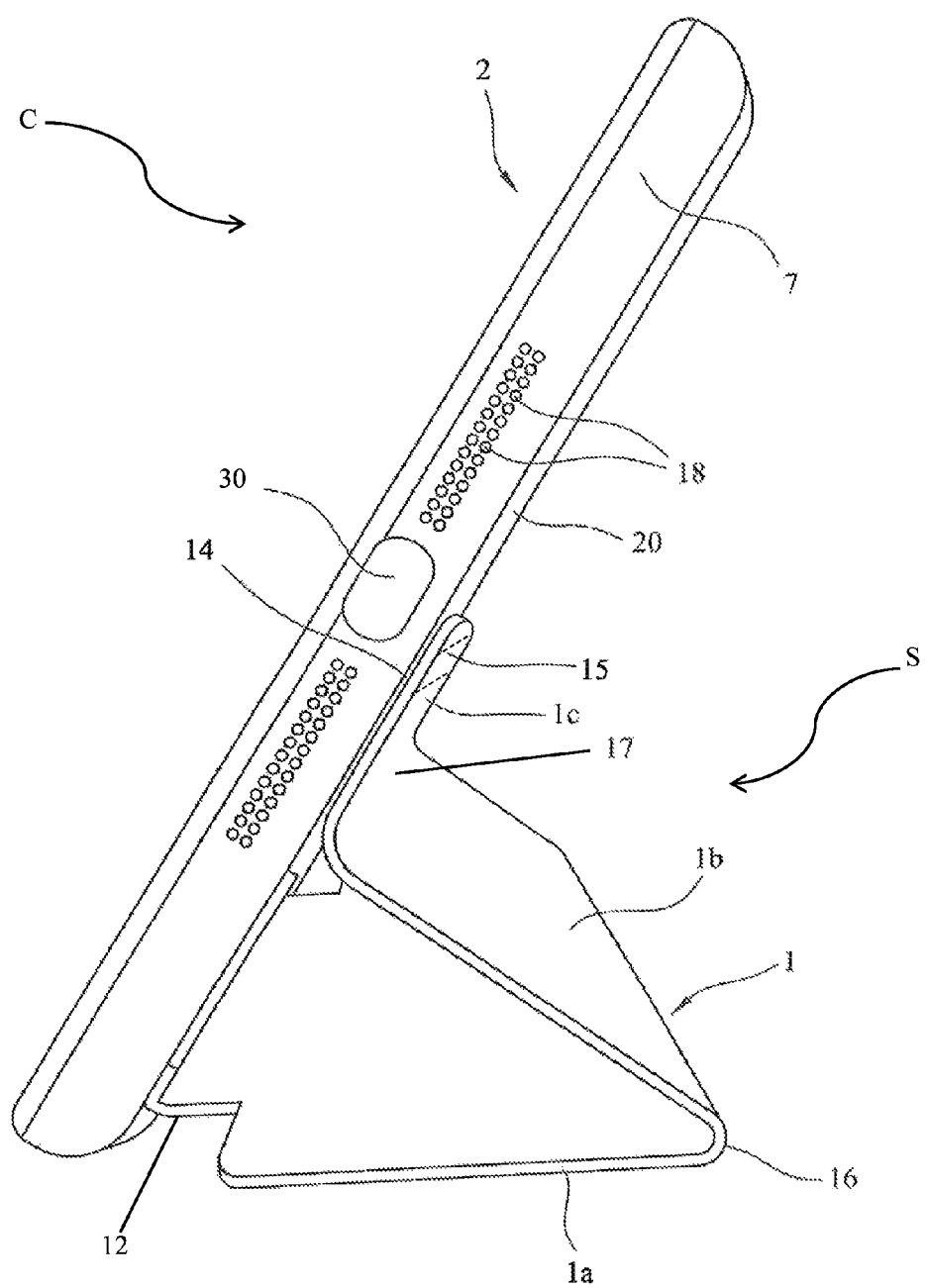
FIG. 4 is a perspective view of the embodiment shown in FIG. 1 in the folded position.
Figure 5:
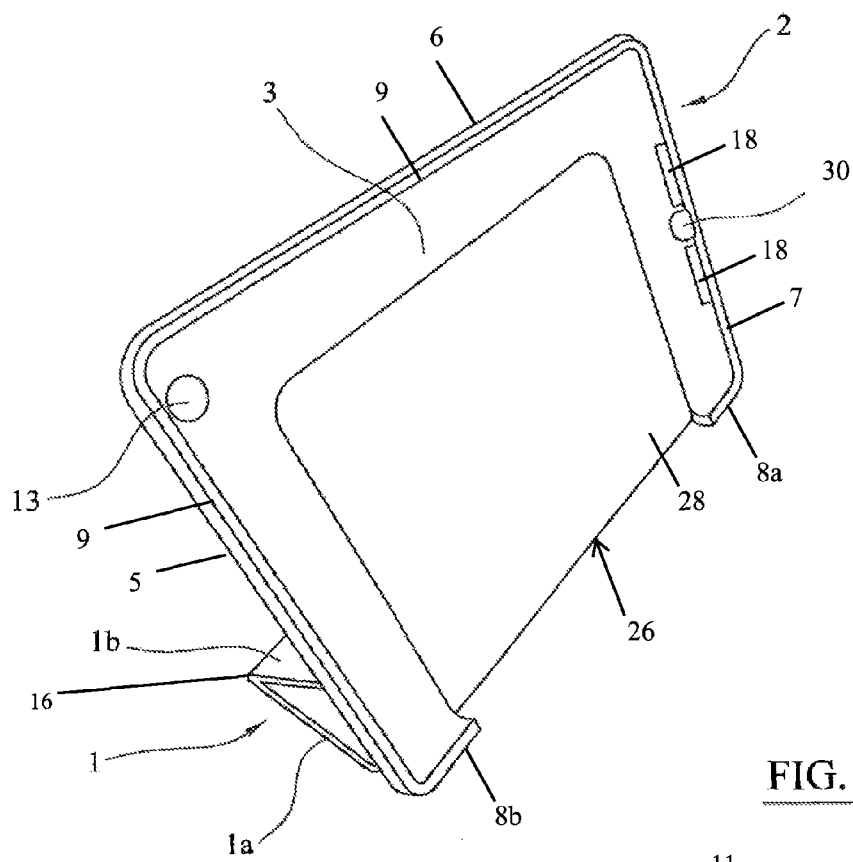
FIG. 5 is another perspective view of the embodiment shown in FIG. 1 in the folded position.
Figure 6:
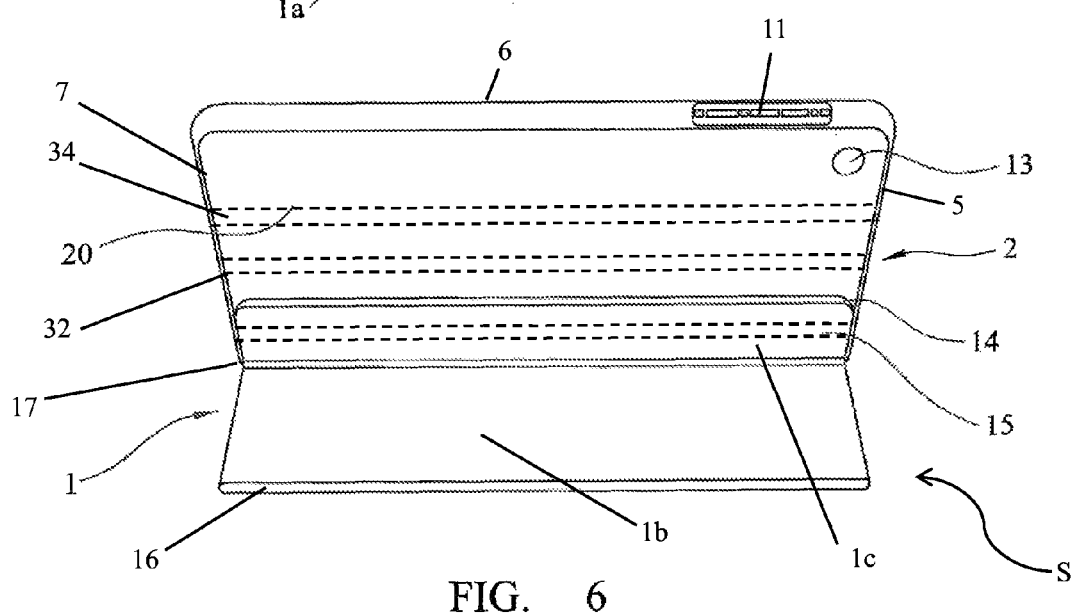
FIG. 6 is a posterior view of the embodiment shown in FIG. 1 in the folded position.

Referring now to FIGS. 2 and 3, the tablet case C comprises a cover 1 and a housing 2. The cover 1 is made from plastic materials, for example polyurethane or thermoplastics including but not limited to acrylonitrile butadiene styrene, polycarbonate and thermoplastic elastomers, rubber or leather; the material is shaped as a substantially rectangular planar member arranged to cover a tablet screen. The cover 1 comprises a foldable planar member 22 (or sheet) and an elongated member 24 which extends from the foldable planar member 22 into an open or exposed side 26 of the housing 2 and further into an indentation 28 in the housing 2 thereby linking the cover 1 to the housing 2. The joining means 12 (hereinafter referred to as a "joint" 12) closes the exposed side 26 of the housing 2 when the foldable planar member 1 is extended over the screen of the tablet T. Partial upstanding walls 8a and 8b each having a partial flange, 9a and 9b respectively, allow the exposed side 26 to be completely closed when the foldable planar member 1 extends over the tablet T and the joint 12 closes the exposed side 26, thereby ensuring that the tablet T does not slide into and out of the housing 2. The overhanging section of the elongated member 24 is secured with an adhesive to the indentation 28 in the housing 2 so that, when secured, the elongated member 24 occupies the indentation 28 and is substantially flush with the remainder of the housing 2 thus forming the substantially planar surface 3. The housing 2 comprises a camera opening 13 arranged to allow a tablet's camera to remain uncovered and therefore functional. The housing 2 also has a substantially planar rear or outer wall 20 which corresponds to the exterior side of the housing 2, thereby defining the exterior compliment of the internal planar surface 3; the rear wall 20 comprises first magnetic means (hereinafter referred to herein as the "first magnetic region") 14 having a plurality of magnets arranged in a longitudinally linear fashion. In this particular embodiment, the plurality of magnets 14 comprises twenty-eight (28) magnets; however, any number of magnets may be used. The foldable planar member 22 comprises three discrete sections 1a, 1b and 1c; the first discrete section 1a is connected to the joint 12 on the elongated member 24, while the second discrete section 1b is connected to the first and third discrete sections 1a, 1c by first and second flexible hinges 16, 17, which allow the foldable planar member 22 to be folded into a stand S. The third section 1c comprises second magnetic means 15 (hereinafter referred to as "the second magnetic region 15") arranged to secure the foldable planar member 1 to a tablet screen in the flat cover position, so as to cause the tablet T to go into a sleep mode, or to the support position to engage the first magnetic region 14 located on the rear wall 20 of the housing 2 in the folded stand position. In this specific embodiment, the second magnetic region 15 comprises twenty-eight (28) magnets arranged in a substantially linear fashion so as to be magnetically attracted. Nevertheless, any number of magnets may be used.

Referring now to FIGS. 4 to 8, when the foldable planar member 22 is folded into a stand S by folding the flexible hinges 16, 17 to form in side view a generally triangular stand S in which the first and second discrete sections 1a, 1b of the foldable planar member 22 form two sides of the triangular stand S and the rear wall 20 of the housing 2 forms the final side of the triangular stand S. In this folded position, the second magnetic region 15 on the third discrete section 1c also comprises a plurality of magnets arranged in a longitudinally linear fashion; that is, a plurality of spaced magnets forming a magnetic strip extending horizontally across the folded stand S supported by a surface. This feature allows the second magnetic region 15 to be magnetically secured to the first magnetic region 14 on the rear wall 20 of the housing 2. The resulting stand S can be used on its own in a position hereinafter referred to as reading position or can be used to lift one side of the case C and tablet T while the other side remains in contact with a surface in a position hereinafter referred to as writing position. When the stand S is in the reading position, the tablet T (and also the housing 2) is supported at an angle of between 50° and 70°, typically in the region of 60°. As the first and second magnetic regions 14, 15 each comprise a row of spaced magnets, the magnetic connection is secure and also stable. In an alternative embodiment, one of the magnetic regions 14, 15 comprises a magnetisable steel strip. Moreover, the first and second magnetic regions 14, 15 can remain connected even when a user does not want to use the cover 1 as a stand S but wants to simply hold the case C and use the tablet T on his lap or elsewhere. This keeps the foldable planar member 1 secure while the user lifts the case C. An opening 30 is provided on the upstanding wall 7 arranged to encase the bottom side wall of the tablet so that a charger may be inserted into a charging port. Additional openings 18 are provided to allow air to flow into the tablet T to prevent it from overheating. As seen in FIGS. 7 and 8, the case C, including the foldable planar member 1 and housing 2, of the present invention can be provided in a variety of sizes adapted to receive tablets T of different sizes. It is noteworthy that the tablets T in these figures are both held at angles of between 50° and 70°.

In an alternative embodiment (not shown), the tablet case C has all the features described in relation to FIGS. 1 to 8 above and, in addition, the housing 2 further comprises one or more further magnetic regions 32, 34 on the rear wall 20 of the housing 2, such as, a plurality of spaced magnets arranged in a longitudinally linear fashion to form one or more further magnetic strips. The further magnetic regions 32, 34 are spaced apart from the first magnetic region 14 and allow a user to fold the cover C into a stand S and secure it in a second, different, support position among others. This feature provides added versatility to the tablet case C.

In another alternative embodiment (not shown), the tablet case C has all the features described in relation to FIGS. 1 to 8 above and, in addition, each partial flange 9a and 9b has a cut-out 36a, 36b (shown in FIG. 2) arranged to facilitate insertion or removal of the tablet T into or out of the housing 2.

In a further alternative embodiment the flange 9 on any of the upstanding walls 5, 6, 7 comprises a groove 38, 40, 42 arranged to provide space for a use's finger and therefore facilitate opening of the foldable planar member 1.

Although the case C (i.e. the housing 2 and foldable planar member 1) has been described as being substantially rectangular, the shape of the case C (the housing 2 and the foldable planar member 1) may be varied to accommodate tablets T having different shapes, such as square tablets or circular tablets.

In an alternative embodiment, each discrete section 1a, 1b, 1c of the foldable planar member 1 could form a side of the triangular stand S in which the third section 1c forms a partial side of the triangular stand S. In a further alternative embodiment, the housing 2 comprises three or more pluralities of spaced magnetic regions 32, 34 arranged in a longitudinally linear fashion spaced apart from each other so as to provide three or more, as appropriate, folding positions.

Although the first and second magnetic regions 14, 15 have been described as being a row of spaced magnets arranged in a linear fashion, a magnetic or magnetisable strip, for example a strip or film made of metal, metallic compounds or magnetisable material, could also be used. Further, if a row of spaced magnets is used, it should be clear that any number of magnets may be used. For example, only two magnets could be used on each the first and second magnetics regions 14, 15.

It should be apparent that the elongated member 24 can be secured to the indentation 28 on the interior of the housing 2 by securing means (i.e., a securement) other than adhesive means (i.e., an adhesive); for example, rivets or other flush fasteners could be used. Equally, both parts could be integral, being produced by single moulding injection. In this case, the hinges (i.e., the joint 12) would preferably be film hinges.

It should be noted that features from one embodiment described above could be used in the other described embodiments. Equally, the alternative features described above could be used in any of the described embodiments and/or combined in several permutations to provide different embodiments.

The invention claimed is:

1. A tablet case, comprising:
  a housing adapted to encase a tablet, the housing comprising a planar inner surface arranged to abut a rear wall of a tablet, three upstanding walls arranged to engage three side walls of the tablet, at least one of the three upstanding walls having a flange arranged to engage and retain the tablet in the housing;
  a cover having a foldable planar member and an elongated member linked to one another via a joint, wherein the foldable planar member is foldable into three discrete sections separated by flexible hinges;
  an indentation in the planar inner surface of the housing to which the elongated member is attached, thereby connecting the cover to the housing;
  a first magnetic region arranged on an outer wall of the housing; and
  a second magnetic region disposed on a first section of the three discrete sections,
  wherein the foldable planar member is adapted to cover a surface of the tablet when in an unfolded position,
  wherein the first section of the foldable planar member is magnetically secured to the rear wall of the housing, via a magnetic connection between the first magnetic region and the second magnetic region when the foldable planar member is folded into a first support position,
  wherein at least two of the upstanding walls comprise upstanding, partial walls,
  wherein the upstanding partial walls comprise partial flanges, and
  wherein at least the flange and the partial flanges ensure that the tablet does not slide into and out of the housing.

2. A tablet case according to claim 1, wherein the first and second magnetic regions comprise at least two spaced magnets.

3. A tablet case according to claim 2, wherein the first magnetic region and the second magnetic region each form magnetic strips extending in a substantially linear manner.

4. A tablet case according to claim 1, wherein the foldable planar member is arranged support the housing at an angle of between 50 and 70 degrees when the first support position.

5. A tablet case according to claim 4, wherein the angle is substantially 60 degrees.

6. A tablet case according to claim 1, wherein the housing is made from at least one of plastic materials, rubber or carbon fibre.

7. A tablet case according to claim 1, wherein the cover is made from at least on of plastic materials, rubber or leather.

8. A tablet case according to claim 6, wherein the plastic material is at least one of polyurethane or a thermoplastic material.

9. A tablet case according to claim 7, wherein the plastic material is at least one of polyurethane or a thermoplastic material.

10. A tablet case according to claim 9, wherein the thermoplastic material is at least one of acrylonitrile butadiene styrene, polycarbonate or a thermoplastic elastomer.

11. A tablet case according to claim 1, wherein the housing comprises openings to allow access to at least one of buttons or ports located on the tablet.

12. A tablet case according to claim 1, wherein the rear wall of the housing comprises at least one further magnetic region spaced apart from the first magnetic region to allow the foldable planar member to be magnetically secured to the rear wall of the housing in a second support position.

13. A tablet case according to claim 1, wherein the at least two upstanding, partial walls comprise a first partial wall having a first partial flange and a second partial wall having a second partial flange on a fourth side of the housing.

14. A tablet case according to claim 13, wherein each of the first and second partial flanges comprises a cut-out arranged to facilitate at least one of insertion or removal of the tablet into or out of the housing.

15. A tablet case according to claim 14, wherein a groove is provided on the flange.

16. A tablet case according to claim 1, further comprising openings to allow air to flow into the tablet to prevent the tablet from overheating.

\* \* \* \* \*